United States Patent [19]

Geese

[11] Patent Number: 4,646,396

[45] Date of Patent: Mar. 3, 1987

[54] FLEXIBLE KEEPER FOR RETAINING A HOOK TO AN ARTICLE CONNECTED THERETO

[75] Inventor: Larry L. Geese, Placentia, Calif.

[73] Assignee: Ancra Corporation, Hawthorne, Calif.

[21] Appl. No.: 338,269

[22] Filed: Jan. 11, 1982

[51] Int. Cl.⁴ .................... A43C 11/08; A44B 13/00
[52] U.S. Cl. ..................... 24/230.5 R; 24/241 SL; 24/373; 223/88; 248/302
[58] Field of Search ............... 24/230.5, 265, 225, 24/226, 201, 373, 374, 129, 238, 241; 59/85, 93; 43/43.4; 294/82 R; 223/88; 248/302

[56] References Cited

U.S. PATENT DOCUMENTS

| | | | |
|---|---|---|---|
| 587,211 | 3/1897 | Clark | 24/241 SL |
| 816,473 | 3/1906 | Johnson | 248/302 |
| 1,721,801 | 7/1929 | Alexander | 59/85 |
| 2,877,941 | 3/1959 | Melone | 223/88 |
| 3,605,318 | 3/1970 | Santo et al. | 43/43.4 |
| 3,782,672 | 1/1974 | Larson | 248/302 |
| 4,222,157 | 9/1980 | Forman | 24/129 A |

FOREIGN PATENT DOCUMENTS 1188738  9/1959  France .................................. 24/373

Primary Examiner—Gene Mancene
Assistant Examiner—J. Hakomaki
Attorney, Agent, or Firm—Edward A. Sokolski

[57] ABSTRACT

A hook is retained to an article to which it is connected a flexible rubber keeper member in the form of a strip having a pair of holes formed therein through which opposing portions of the "U" of the hook are fitted. The rubber keeper is removably held in position on the hook by virtue of the elasticity of such keeper, and further, in one embodiment, by means of a pair of grooves formed in the "U" portion of the hook into which one of the apertured portions of the keeper fits. In another embodiment of the invention, such retention is aided by means of a dimple formed in this "U" portion over and beyond which one of the apertured portions of the keeper is pulled, this dimple inhibiting the removal of this apertured portion of the hook. The keeper thus provides an economical, firm retainer for the hook which can readily be removed therefrom to terminate such retention action by pulling an end of the keeper in a manner such that the elasticity thereof enables the unseating of one of the keeper apertures from its position on the hook.

7 Claims, 9 Drawing Figures

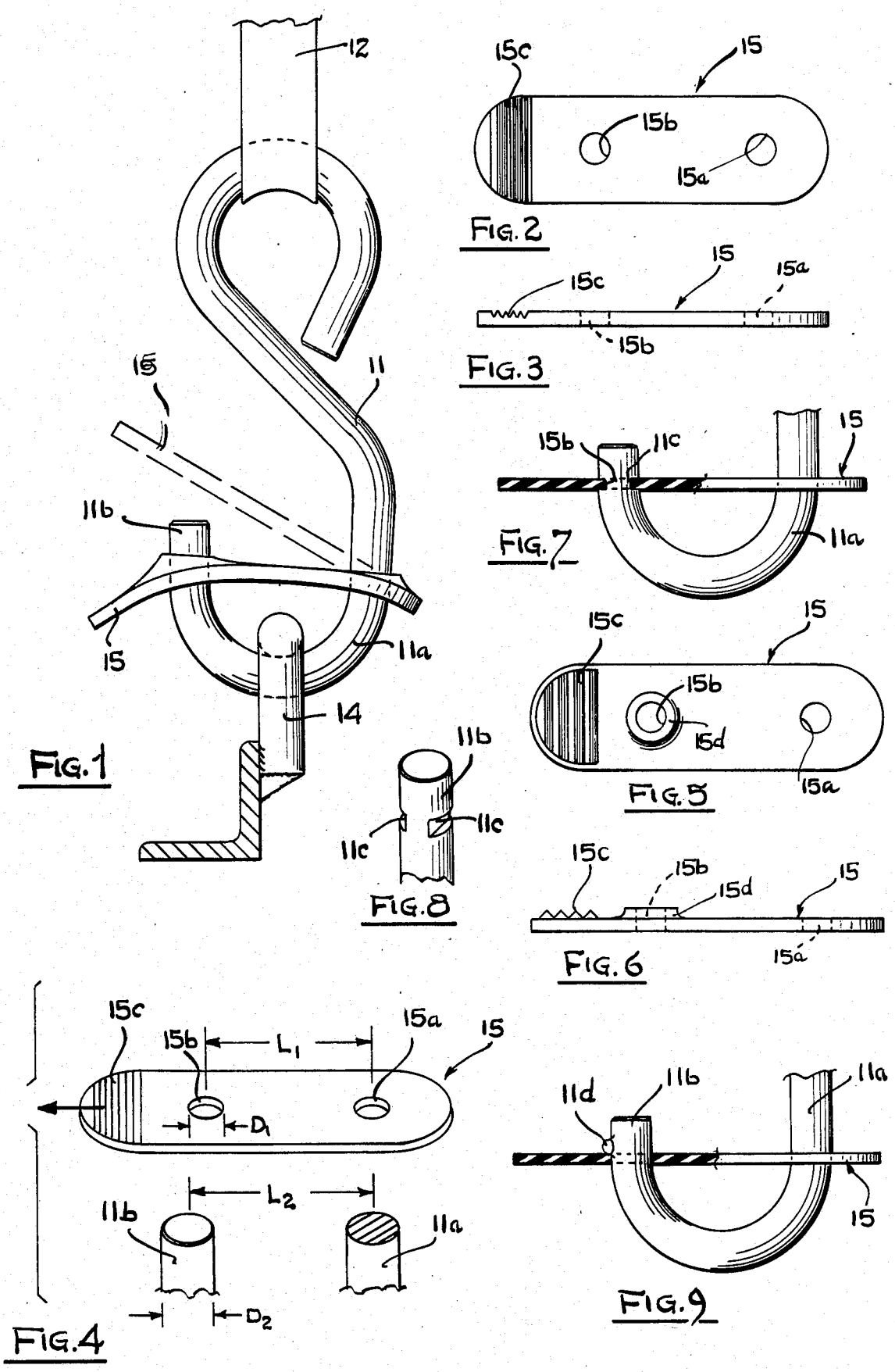

FLEXIBLE KEEPER FOR RETAINING A HOOK TO AN ARTICLE CONNECTED THERETO

This invention relates to a flexible keeper for a hook, and more particularly to such a device which has apertures therein which fit over the "U" portion of the hook which is removably retained on the hook.

Where a hook member is used to engage an object, as for example in lifting such object, it is highly desirable to provide means for retaining the hook to the object while it is being lifted or otherwise drawn, while at the same time permitting quick release of such retention action once the object has been lifted or drawn to its final resting position. Prior art devices have been developed for such keeping action and are described, for example, in U.S. Pat. No. 1,093,945 to Ohlsson and U.S. Pat. No. 1,365,677 to Flynn, Jr. In both of these devices, the keeper employed is fabricated of a rigid metal and is retained in place by the action of a coil spring or some type of latching device. This makes for a rather expensive construction and, in some instances, a construction which does not permit the removal of the keeper as easily as would be desired.

The device of the present invention overcomes the aforementioned shorcomings of the prior art in providing a one-piece keeper device in the form of a flat strip which is fabricated of an elastic economical material, such as rubber or a suitable plastic. This keeper device has a pair of spaced apertures formed therein which fit over the hook with the device in its installed position, such apertures fitting in grabbing relationship around opposite portions of the "U" of the hook. In certain embodiments of the invention, the aperture fitted over the open end of the hook is aided in its retention in position by means of retaining means formed in this portion of the hook, which retaining means may take the form of grooves or a dimple. The keeper is thus retained in position while the hook is in use, and when the object retained thereon is to be removed, the keeper can be pulled off the open end of the hook by virtue of its elasticity.

It is therefore an object of this invention to provide a simple and economical keeper for a hook.

It is a further object of this invention to provide a flexible keeper member for retaining objects to a hook which can be readily removed therefrom when the retention of the object is no longer required.

Other objects of this invention will become apparent as the description proceeds in connection with the accompanying drawings of which:

FIG. 1 is a side elevational view illustrating the device of the invention being used to retain the hook to an object being lifted thereby;

FIG. 2 is a top plan view of a first embodiment of the retainer member of the invention;

FIG. 3 is a side elevational view of the first embodiment of the retainer member of the invention;

FIG. 4 is a schematic view illustrating the dimensional relationships employed in the first embodiment of the invention;

FIG. 5 is a top plan view illustrating a second embodiment of the retainer member of the invention;

FIG. 6 is a side elevational view of the second embodiment of the retainer member of the invention;

FIG. 7 is a side elevational view with partial section cut away of a further embodiment of the invention employing a retainer notched portion formed in the body of the hook;

FIG. 8 is a perspective view illustrating the notched portion of the embodiment of FIG. 7; and FIG. 9 is a side elevational view of still a further embodiment of the invention wherein a dimpled portion is formed in the body of the hook to aid in the retention of the retainer member.

Referring now to FIGS. 1-4, a first embodiment of the invention is illustrated. Hook member 11 is suspended from a support member (not shown) by means of support band 12, the "U"-shaped portion 11a of the hook having a member 14 to be lifted or supported in position suspended thereon. Keeper or retainer member 15, which is fabricated of a flexible elastic material such as rubber or a suitable plastic, has a pair of apertures 15a and 15b formed therein, the hook being fitted through the apertures as shown in FIG. 1 in a holding relationship. Keeper member 15 has a grooved grip portion 15c to facilitate the manual stretching of the member over the hook. As illustrated in FIG. 4, the apertures 15a and 15b of retainer member 15 have diameters $D_1$ which are smaller than the diameter $D_2$ of the hook, and the distance $L_1$ between the centers of apertures 15a and 15b is less than the distance $L_2$ between the centers of the two opposing arm portions of the hook. Thus, the keeper member 15 is installed on the hook by first forcing the apertured portion 15a over the hook, up onto the body portion 11a thereof, and then stretching the keeper member and pushing the very end portion 11b of the hook through aperture 15b, as shown in FIG. 1. Thus, the keeper member 15 is effectively force fitted onto the hook by virtue of its elastic characteristics and retained in position by such elasticity. It is to be noted that while the legs of the "U" of the hook member have been shown substantially parallel to each other, that such legs need not be parallel and may diverge from or converge towards each other.

Referring now to FIGS. 5 and 6, a modified version of the keeper member 15 is illustrated. This second embodiment differs from the first in two respects. Firstly, it has a raised reinforcement ring member running around aperture 15b to provide reinforcement and added strength around this apertured portion to minimize the wear thereof with continued release of the retainer from the end of the hook and reinstallation thereon. Further, this second embodiment has a raised striated grip portion 15c, rather than such grip portion being at the level of the remainder of the surface of the retainer member, as in the first embodiment.

Referring now to FIGS. 7 and 8, a further embodiment of the invention is illustrated. In this embodiment, the end portion 11b of the hook has a pair of grooves 11c formed therein into which the apertured portion 15b of the keeper member 15 fits. This affords positive latching of the keeper member on the hook. With such positive latching action, it is not necessary to make the distance between apertures 15a and 15b significantly less than that between the centers of the opposing portions 11a and 11b of the hook, and these two distances can be substantially the same. The diameter of apertures 15a and 15b should, however, be less than that of the hook to assure positive gripping of the retainer member thereon.

Referring now to FIG. 9, a still further embodiment of the invention is illustrated. In this embodiment, positive latching of the keeper member 15 is achieved by means of a dimple 11d formed on the wall of end portion 11b of the hook beyond which the respective apertured portion of the retainer member is pulled. Otherwise, this embodiment of the invention is the same as the previous embodiment with the retention action being enhanced by virtue of dimple 11d.

While the invention has been described and illustrated in detail, it is clearly to be understood that this is intended by way of illustration and example only and is not to be taken by way of limitation, the spirit and scope of this invention being limited only by the terms of the following claims.

I claim:

1. In combination, a hook member and a keeper for retaining an article on a generally U-shaped hook portion of the hook member having opposing legs forming the "U", said keeper comprising:

a flat flexible elastic strip member having a pair of spaced apart apertures formed therethrough, the diameter of the legs of said hook portion being greater than that of said apertures, said keeper being elastically retained on the hook member with each of the legs of the hook member fitted through a respective one of the apertures of said elastic strip member.

2. The keeper of claim 1 wherein the spacing between the centers of said apertures is less than that between the centers of the legs of said "U".

3. The keeper of claim 1 wherein the spacing between the centers of said apertures is approximately equal to that between the centers of the legs of said "U".

4. The keeper of claim 1 wherein a grooved grip portion is formed on said strip member near one end thereof.

5. The keeper of claims 1 or 4 and further including a raised reinforcement member formed around one of the apertures of said strip member.

6. The keeper of claim 1 wherein one of the legs of the U-shaped hook portions has groove means formed therein into which one of the apertured portions of said strip member is fitted.

7. The keeper of claim 1 wherein one of the legs of the U-shaped hook portion has a dimple formed thereon beyond which one of the apertured portions of the strip member is pulled.

* * * * *